US009875734B2

United States Patent
Agrawal et al.

(10) Patent No.: US 9,875,734 B2
(45) Date of Patent: Jan. 23, 2018

(54) METHOD AND APPARATUS FOR MANAGING AUDIO READOUTS

(71) Applicant: Motorola Mobility LLC, Chicago, IL (US)

(72) Inventors: Amit Kumar Agrawal, Bangalore (IN); Satyabrata Rout, Bangalore (IN)

(73) Assignee: Motorola Mobility, LLC, Chicago, IL (US)

( * ) Notice: Subject to any disclaimer, the term of this patent is extended or adjusted under 35 U.S.C. 154(b) by 47 days.

(21) Appl. No.: 14/987,903

(22) Filed: Jan. 5, 2016

(65) Prior Publication Data

US 2017/0193982 A1   Jul. 6, 2017

(51) Int. Cl.
| | | |
|---|---|---|
| G10L 21/00 | (2013.01) | |
| G10L 13/04 | (2013.01) | |
| G06K 9/00 | (2006.01) | |
| G07C 9/00 | (2006.01) | |
| G10L 21/10 | (2013.01) | |

(52) U.S. Cl.
CPC .......... *G10L 13/04* (2013.01); *G06K 9/00335* (2013.01); *G06K 9/00597* (2013.01); *G07C 9/00158* (2013.01); *G10L 21/10* (2013.01)

(58) Field of Classification Search
CPC .... G11B 27/36; G11B 2220/20; H04N 17/06; H04N 5/247; H04N 7/185
USPC .............................. 704/270, 260, 275, 270.1
See application file for complete search history.

(56) References Cited

U.S. PATENT DOCUMENTS 9,131,062 B2 *  9/2015  Wakasa ..................... G06F 3/16

OTHER PUBLICATIONS

Amit Kumar Agrawal, et al., "Method and Apparatus for Setting a Notification Readout Mode Based on Proximity Detection", U.S. Appl. No. 14/746,979, Jun. 23, 2015.
Boby Iyer, et al., "Queueing Voice Assist Messages During Microphone Use", U.S. Appl. No. 14/740,644, Jun. 16, 2015.
Boby Iyer, et al., "Suppressing Alert Messages Based on Microphone States of Connected Devices", U.S. Appl. No. 14/740,662, Jun. 16, 2015.
Motorola Mobility LLC, "Motorola Assist", https://play.google.com/store/apps/details?id=com.motorola.contextual.smartrules2, Mar. 31, 2016, 3 pages.
Google, "DriveMODE (Auto Loudspeaker)", https://play.google.com/store/apps/details?id=com.glasscube.drivemode_beta, Mar. 31, 2016, 3 pages.

* cited by examiner

*Primary Examiner* — Charlotte M Baker
(74) *Attorney, Agent, or Firm* — Kunzler PC

(57) ABSTRACT

For managing audio readouts and visual notifications, a method and apparatus are disclosed. The apparatus includes audio output device, a display device, a processor, and a memory that stores code executable by the processor to: present, via the audio output device, an audio readout to the user of the apparatus, determine a user attention state, and present, via the display device, a visual cue in a visual notification that corresponds to the audio readout, in response to the user attention state being a state of user interest. The visual cue may indicate a location in the visual notification that corresponds to a current position of the audio readout. Determining the user attention state to be a state of user interest may include receiving sensor data and determining whether a user is holding the apparatus based on the sensor data.

20 Claims, 5 Drawing Sheets

METHOD AND APPARATUS FOR MANAGING AUDIO READOUTS

FIELD

The subject matter disclosed herein relates to audio readouts and more particularly relates to managing audio readouts and visual notifications on an electronic device.

BACKGROUND

Description of the Related Art

With advances in speech synthesis and voice recognition in computer systems, it is feasible for a user to interact with a mobile device, such as a smart phone, solely with spoken inputs and audio outputs. However, while humans understand when to pause conversation, computers are unable to determine when audio readout should be presented or not. Currently, audio readouts can be lengthy and cumbersome to the user, and at times inappropriate. Lengthy audio readouts also do not provide the user with a chance to interrupt the readout.

BRIEF SUMMARY

A method for managing audio readouts and visual notifications is disclosed. An apparatus is disclosed that implements the functions of the method.

The method may include presenting an audio readout to a user using an electronic device. The method may also include determining a user attention state. The method may further include presenting a visual cue in a visual notification corresponding to the audio readout in response to the user attention state being a state of user interest.

In one embodiment, the visual cue indicates a location in the visual notification corresponding to a current position of the audio readout. In some embodiments, determining the user attention state includes receiving image data of the user. Determining the user attention state may also include determining whether the user is looking at the electronic device based on the image data. Determining the user attention state may further include determining the user attention state to be a state of user interest in response to the user looking at the electronic device.

In certain embodiments, presenting the visual cue in the visual notification includes displaying the visual notification on an external device communicatively coupled to the electronic device and presenting the visual cue on the visual notification displayed on the external device. In some embodiments, determining the user attention state includes receiving sensor data and determining whether a user is holding the electronic device based on the sensor data. Determining the user attention state may also include determining the user attention state to be a state of user interest in response to a user holding the electronic device.

In certain embodiments, the method includes receiving image data in response to determining that a user is holding the electronic device and determining whether a user holding the electronic device is an authorized user of the electronic device based on the image data. The method may further include pausing the audio readout in response to the user holding the electronic device not being an authorized recipient of the audio readout and restricting access to the electronic device in response to the user holding the electronic device not being an authorized user of the electronic device.

In certain embodiments, the method includes receiving image data in response to determining that a user is holding the electronic device and determining whether the user is looking at the electronic device based on the image data. The method may further include presenting a visual notification corresponding to the audio readout in response to the user looking at the electronic device, wherein presenting a visual cue in a visual notification comprises presenting the visual cue in the visual notification in response to the user looking at the electronic device.

In some embodiments, the method includes pausing the audio readout in response to the user attention state being a state of user distraction, re-determining the user attention state in response to pausing the audio readout, and resuming the audio readout in response to the user attention state no longer being a state of user distraction. In certain embodiments, resuming the audio readout includes obtaining a summary of a portion of the audio readout previously presented to the user, prompting the user whether to present the summary, and presenting the summary in response to an affirmative response to the prompt.

In certain embodiments, determining the user attention state includes measuring an ambient noise level at the electronic device and comparing the ambient noise level to an inaudible state threshold. Determining the user attention state may also include determining the user attention state to be a state of user distraction in response to the ambient noise level being above the inaudible state threshold. In certain embodiments, re-determining the user attention state includes measuring an ambient noise level at the electronic device, comparing the ambient noise level to an audible state threshold, and determining the user attention state to no longer be a state of user distraction in response to the ambient noise level returning below the audible state threshold for a threshold amount of time.

In some embodiments, the method includes determining whether the ambient noise level remains above an audible state threshold for a predetermined time frame and presenting the visual notification and the visual cue, in response to the ambient noise level remaining above the audible state threshold for the predetermined time frame, wherein the visual cue indicates a location in the visual notification corresponding to a current position of the audio readout. The method may further include receiving a notification and receiving a user command to read the notification, wherein presenting the audio readout comprises presenting an audio readout to the user in response to the user command, the audio readout corresponding to the received notification.

In some embodiments, the method includes determining a length of the notification and prompting the user whether to present a summary readout of the notification in response to the length exceeding a predetermined length, wherein presenting the audio readout comprises presenting the summary readout in response to an affirmative response to the prompt. In other embodiments, the method includes determining a length of the notification, wherein presenting the audio readout comprises presenting a summary readout of the notification in response to the length exceeding a predetermined length and prompting the user whether to present the entire notification, wherein presenting the audio readout further comprises presenting a full readout corresponding the entire notification in response to an affirmative response to the prompt.

The apparatus includes an audio output device, a display device, a processor, and a memory that stores code executable by the processor. When executing the code the processor presents, via the audio output device, an audio readout to a user of the apparatus, determines a user attention state, and presents, via the display device, a visual cue in a visual notification that corresponds to the audio readout in response to the user attention state being a state of user interest.

In certain embodiments, the apparatus includes an image sensor configured to capture image data. Determining the user attention state may include receiving image data of the user, determining whether the user is looking at the display device based on the image data, and determining the user attention state to be a state of user interest in response to the user looking at the display device, wherein the visual cue indicates a location in the visual notification corresponding to a current position of the audio readout.

In some embodiments, the memory further includes code executable by the processor to terminate the audio readout in response to presenting the visual cue. In certain embodiments, determining the user attention state includes receiving sensor data, determining whether a user is holding the apparatus based on the sensor data, and determining the user attention state to be a state of user interest in response to a user holding the apparatus.

In certain embodiments, the apparatus includes an ambient noise sensor, wherein the memory further comprises code executable by the processor to: measure an ambient noise level at the apparatus, compare the ambient noise level to an inaudible state threshold, pause the audio readout in response to the ambient noise level being above the inaudible state threshold, re-measure an ambient noise level at the user device in response to pausing the audio readout, compare the re-measured ambient noise level to an audible state threshold, resume the audio readout in response to the re-measured ambient noise level being below the audible state threshold for a threshold amount of time, and present visual notification and the visual cue, in response to the ambient noise level remaining above the audible state threshold for a predetermined time frame.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
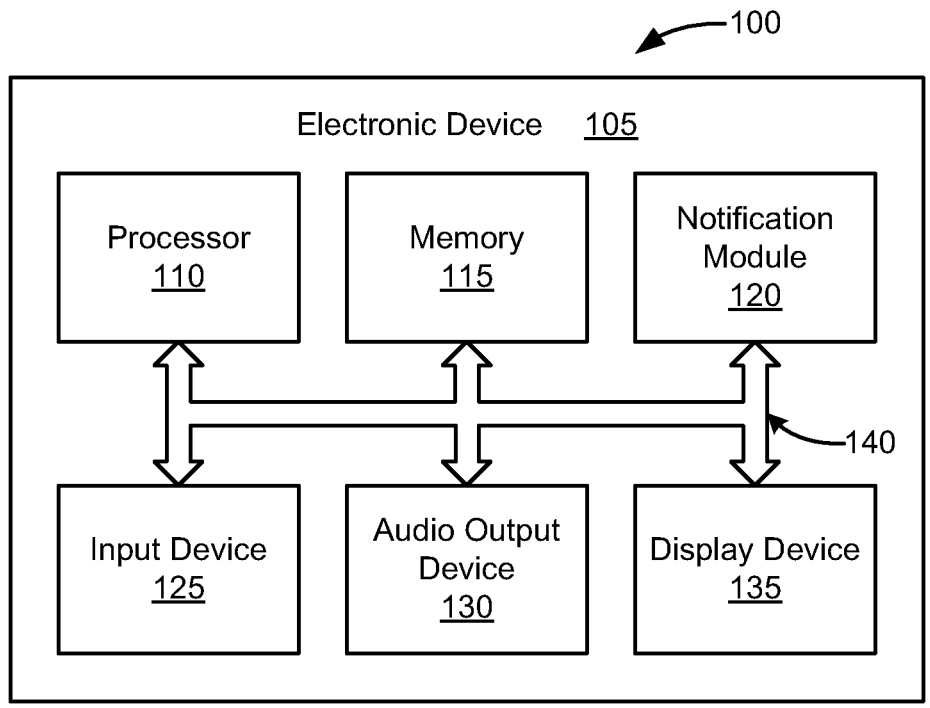
FIG. 1 is a schematic block diagram illustrating one embodiment of a system for managing audio readouts and visual notifications.

As will be appreciated by one skilled in the art, aspects of the embodiments may be embodied as a system, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 is a schematic block diagram illustrating a system 100 for managing audio readouts and visual notifications, according to embodiments of the disclosure. The system 100 includes an electronic device 105. The electronic device 105, in one embodiment, includes a processor 110, a memory 115, a notification module 120, an input device 125, an audio output device 130, and a display device 135, which are communicatively coupled to one another via a computer bus 140.

The electronic device 105 may be any digital device capable of presenting both audio readouts and visual notifications, including, but not limited to, a general-purpose computing device, a special-purpose (dedicated) computing device, and the like. In some embodiments, the electronic device 105 may be a personal computer, including, but not limited to, a mobile phone, a smart phone, a tablet computer, a laptop computer, a handheld computer, a wearable computer, a desktop computer, a gaming console, or the like.

The processor 110, in one embodiment, may comprise any known controller capable of executing computer-readable instructions and/or capable of performing logical operations. For example, the processor 110 may be a microcontroller, a microprocessor, a central processing unit (CPU), a graphics processing unit (GPU), an auxiliary processing unit, a FPGA, or similar programmable controller. In certain embodiments, the processor 110 may include a plurality of processing units, such as a plurality processing cores, a plurality of CPUs, a plurality of microcontrollers, or the like. In some embodiments, the processor 110 executes instructions stored in the memory 115 to perform the methods and routines described herein. The processor 110 is communicatively coupled to the memory 115, the notification module 120, the input device 125, the audio output device 130, and the display device 135.

The memory 115, in one embodiment, is a computer readable storage medium. In some embodiments, the memory 115 includes volatile computer storage media. For example, the memory 115 may include a random access memory (RAM), including dynamic RAM (DRAM), synchronous dynamic RAM (SDRAM), and/or static RAM (SRAM). In some embodiments, the memory 115 includes non-volatile computer storage media. For example, the memory 115 may include a hard disk drive, a flash memory, or any other suitable non-volatile computer storage device. In some embodiments, the memory 115 includes both volatile and non-volatile computer storage media.

The notification module 120, in one embodiment, is configured to present an audio readout to user. For example, the notification module 120 may control the audio output device 130 to present the audio readout. The notification module 120 may further be configured to determine a user attention state, such as a state of interest, a state of distraction, or neutral state of neither interest nor distraction. Based on the determined user attention state, the notification module 120 may continue presenting the audio readout, may pause the audio readout, and/or may present a visual cue on a visual notification corresponding to the audio readout.

In one embodiment, the notification module 120 presents a visual cue in a visual notification that corresponds to the audio readout in response to the user attention state being a state of user interest. For example, the notification module 120 may control the display device 135 to display the visual cue and the visual notification. The state of user interest may be determined by the user holding the electronic device 105 and/or looking at the display device 135. In one embodiment, the visual cue may indicate a location in the visual notification corresponding to a current position of the audio readout. In another embodiment, the visual cue may indicate a location in the visual notification corresponding to a last presented portion of the audio readout.

In some embodiments, the notification module 120 may pause the audio readout in response to determining the user attention state to be a state of distraction. For example, if an ambient noise level exceeds a certain threshold, the notification module 120 may pause audio readout due to the user being distracted by the ambient noise and/or unable to hear the audio readout due to the ambient noise. In further embodiments, the notification module 120 may resume the audio readout in response to the user attention state no longer being a state of distraction. For example, if the ambient noise level drops below an audible threshold for a threshold amount of time, then the notification module 120 may resume the audio readout. In such embodiments, the notification module 120 prevents prematurely resuming the audio readout where the noise level fluctuates by resuming the audio readout only when the noise level drops to audible levels for a sustained period of time, for example 2-3 seconds.

In certain embodiments, the notification module 120 may determine whether the user is holding the electronic device 105 and then determine whether the user is looking at the display device 135. In response to the user both holding the electronic device 105 and looking at the display device 135, the notification module 120 may present the visual cue and visual notification and may also seize presenting the audio readout. Further details and capabilities of the notification module 120 are discussed below, particularly with reference to FIGS. 2 and 3. The notification module 120 may comprise hardware circuits, program code operating on a processing device, or combinations of hardware circuits and program code.

The input device 125, in one embodiment, may comprise any known computer input device including a touch panel, a button, a keyboard, or the like. Further, the input device 125 may include a microphone or other device for receiving audible inputs. In some embodiments, the input device 125 may include various sensors for receiving pressure data, temperature data, acceleration data, proximity data, image data, and the like. For example, the input device 125 may include one or more of a proximity sensor (e.g., a photo sensor or a capacitive sensor), a temperature sensor (e.g., a thermocouple or infrared sensor), a pressure sensor, an accelerometer, a camera, and the like.

In some embodiments, the input device 125 may be integrated with the display device 135. For example, the input device 125 and the display device 135 may be combined as a touchscreen or similar touch-sensitive display. In certain embodiments, the input device 125 comprises two more different devices, such as a touch panel and camera (or other sensor).

The audio output device 130, in one embodiment, may comprise any known device capable of outputting audible sounds to the user. In particular, the audio output device 130 may comprise a speaker, voice synthesizer, or the like. The audio output device 130 may receive an audio readout, for example from the processor 110, the memory 115, and/or the notification module 120, wherein the audio output device 130 presents the audio readout as audible sound.

The display device 135, in one embodiment, may comprise any known electronic display capable of outputting visual data to user. For example, the display device 135 may be an LCD display, an LED display, an OLED display, a projector, or similar display device capable of outputting images, text, and other visual data to the user. In some embodiments, the display device 135 may be integrated with the input device 125, for example as a touchscreen or similar touch-sensitive display.

In one embodiment, the display device 135 may include an external display that is communicatively coupled to, yet physically separate from, the rest of the electronic device 105. For example, the display device 135 may include a smartwatch, a smartphone, a tablet computer, a television, smart glasses, virtual reality goggles, a wearable display, or other electronic display communicatively coupled to the electronic device 105. The display device 135 may receive data for display from the processor 110 and/or from the notification module 120.

Figure 2:
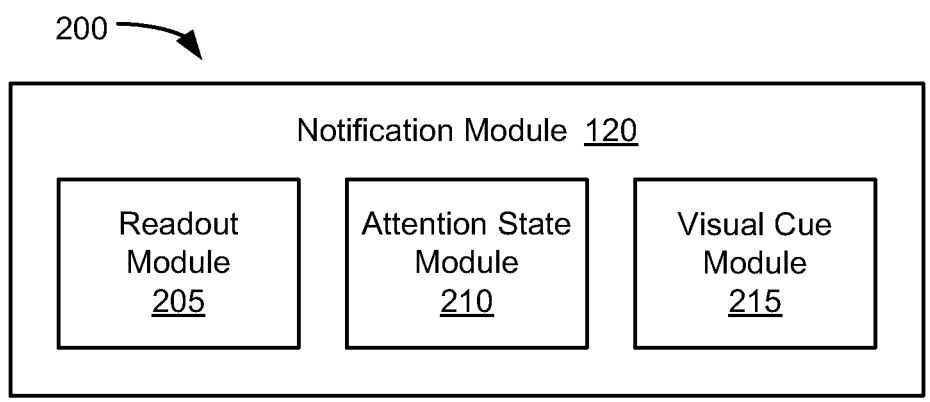
FIG. 2 is a schematic block diagram illustrating one embodiment of an apparatus for managing audio readouts and visual notifications.

FIG. 2 depicts a notification apparatus 200 comprising a notification module 120, according to embodiments of the disclosure. The notification module 120 may be substantially as described above with reference to FIG. 1. Further, the notification module 120 may include a readout module 205, and attention state module 210, and a visual cue module 215, as depicted. The modules 205-215 and 305-355 may be communicatively coupled to one another. The notification module 120 may comprise hardware circuits, program code operating on a processing device, or combinations of hardware circuits and program code.

The readout module 205, in one embodiment, presents an audio readout to user via the electronic device 105. Specifically, the readout module 205 may control the audio output device 130 to present the audio readout. The audio readout, in one embodiment, corresponds to a notification. For example, the electronic device 105 may receive a notification, such as an incoming message, a response to a query, or the like, wherein the audio readout corresponds to the received notification. The notification may be received from an application executing on the electronic device 105.

In certain embodiments, the readout module 205 may present the audio readout in response to a user command. For example, the electronic device 105 may prompt the user whether to read out a received notification, wherein the readout module 205 may present the audio readout in response to a positive response to the prompt. In other embodiments, the readout module 205 may automatically present the audio readout (e.g., without waiting for a user command) in response to the electronic device 105 being in an audio readout mode. For example, the user may place the electronic device 105 in a hands-free mode and the readout module 205 may automatically present an audio readout corresponding to an incoming notification in response to receiving the notification while in the audio readout mode.

In one embodiment, the readout module 205 may pause the audio readout in response to an indication from the attention state module 210. For example, the user attention state module 210 may determine that the user is distracted, as described in further detail below, and the readout module 205 may pause the audio readout while the user is distracted. In response to the user attention state module 210 determining that the user is no longer distracted, the readout module 205 may resume the audio readout.

In another embodiment, the readout module 205 may terminate the audio readout in response to the visual cue module 215 presenting the visual cue. For example, the visual cue module 215 may trigger an exit from the audio readout mode in response to presenting the visual cue, wherein the readout module 205 ceases presenting the audio readout in response to the trigger. The readout module 205 may comprise hardware circuits, program code operating on a processing device, or combinations of hardware circuits and program code.

The attention state module 210, in one embodiment, determines a user attention state. As used herein, a "user attention state" refers to an estimated state of interest or attention of the user with respect to a notification. For example, the attention state module 210 may determine that the user's attention state is one of interest (e.g., a state of user interest) or one of distraction (e.g., state of user distraction). As another example, the attention state module 210 may determine that the user's attention state is neutral state, neither a state of interest nor a state of distraction. In certain embodiments, the attention state module 210 determines the user attention state by gathering sensor input and comparing the sensor input to one or more attention state thresholds.

In one embodiment, the attention state module 210 receives sensor data indicative of whether the user is holding electronic device. Having received sensor data indicative of whether the user is holding the electronic device, the attention state module 210, in one embodiment, determines the user attention state to be a state of user interest in response to the user holding the electronic device. The sensor data indicative of whether the user is holding electronic device may be received from one or more of: a proximity sensor (e.g., a photo sensor or a capacitive sensor), a temperature sensor (e.g., a thermocouple or infrared sensor), a pressure sensor, an accelerometer, a camera, or the like.

For example, the attention state module 210 may receive temperature data and/or pressure from the surface of the body of the electronic device 105 and determine that the electronic device 105 is being held in response to the temperature data and/or pressure data exceeding a threshold. As another example, the attention state module 210 may receive gyroscopic data and/or acceleration data indicative of whether a user is holding the electronic device 105. In yet another example, the attention state module 210 may receive proximity data, such as from a capacitive sensor, indicative of whether a user is holding the electronic device 105. Still further, the attention state module 210 may receive a combination of different types of data (e.g., pressure data, temperature data, acceleration data, proximity data, etc.) and determine whether the electronic device 105 is being held by the user based on the combined data.

In a further embodiment, the attention state module 210 may monitor for changes to the user attention state in response to setting the user attention state as a state of user interest. For example, the user may glance at a visual notification presented in response to the user showing interest (e.g., in response to the attention state module 210 determining the user attention state to be a state of user interest), however, the user may soon look away. Accordingly, the attention state module 210 may determine the user attention state to no longer be a state of user interest, but rather to be a state of distraction or a neutral state (e.g., neither intent nor distracted). In one embodiment, the attention state module 210 may signal the visual cue module 215 to remove the visual cue and/or the visual notification in response to the user looking away from the electronic device 105 (e.g., showing disinterest) after previously holding and/or looking at the electronic device 105. In a further embodiment, where the audio readout was paused in response to the user attention state being a state of interest (e.g., in response to the user looking at the electronic device 105), the readout module 205 may resume the audio readout, optionally after prompting the user whether to continue with the audio readout.

In some embodiments, the attention state module 210 receives sensor data indicative of ambient noise levels at the electronic device 105. For example, the attention state module 210 may receive audio input from a microphone. As another example, the attention state module 210 may measure noise levels using the input device 125, wherein the input device 125 comprises a microphone, noise meter, or other device for measuring ambient noise levels. Having received data indicative of an ambient noise level of the electronic device 105, the attention state module 210 may compare the received data to one or more noise level thresholds.

In one embodiment, the attention state module 210 compares the measured ambient noise level to an inaudible state threshold, the inaudible state threshold corresponding to a noise level at which normal conversation (e.g., conversation at a normal voice levels) becomes inaudible to a user. The inaudible state threshold may be preset and/or user adjustable. In response to the ambient noise level exceeding the inaudible state threshold, the attention state module 210 may determine the user attention state to be one of user distraction.

In another embodiment, the attention set module 210 compares the measured ambient noise level to an audible state threshold, wherein the audible state threshold is lower than the inaudible state threshold. The audible state threshold corresponds to a noise level at which conversation (e.g., a normal voice levels) is audible to a user. The audible state threshold may be lower than the inaudible state threshold by a sufficient degree so as to permit easy conversation. The audible state threshold may also be preset and/or user adjustable. In response to the ambient noise level passing below the audible state threshold, the attention state module 210 may determine that the user attention state is no longer in a state of user distraction. For example, the attention state module 210 may determine the user attention state to be in a neutral state in response to the ambient noise level passing below the audible state threshold (e.g., after first exceeding the inaudible state threshold).

In other embodiments, the attention state module 210 may receive image data of the user indicative of whether the user is looking at the electronic device 105. For example, the attention set module 210 may receive image data from a camera, such as one within the input device 125. Based on the image data, the attention state module 210 may determine whether the user is looking at the electronic device 105. For example, the camera may be a front facing camera and the attention state module 210 may perform eye tracking and/or gaze detection in order to determine whether the user is looking at the electronic device 105. In response to the user looking at the electronic device 105, the attention state module 210 may determine that the user attention state is a state of user interest.

Having determined the user attention state, the attention state module 210 indicates the determined user attention state to the readout module 205 and/or the visual cue module 215. The readout module 205 and/or the visual cue module 215 may perform specific actions in response to receiving the user attention state. For example, the readout module 205 may cease presenting the audio readout in response to the attention state module 210 indicating the user attention state to be a state of user distraction. As another example, the visual cue module 215 may present a visual cue on the display device 135 in response to the attention state module 210 indicating the user attention state to be a state of user interest.

In one embodiment, the attention state module 210 transmits the determined user attention state to the readout module 205 and/or the visual cue module 215. In another embodiment, the attention state module 210 may store the user attention state to a location in the memory 115, wherein the reader module 205 and/or the visual cue module 215 may retrieve the user attention state from the location in the memory 115. In still another embodiment, the attention state module 210 may set one or more flags to indicate determined user attention state. The attention state module 210 may comprise hardware circuits, program code operating on a processing device, or combinations of hardware circuits and program code.

The visual cue module 215, in one embodiment, presents a visual cue in a visual notification in response to the user attention state being a state of user interest, wherein the visual notification corresponds to the audio readout. In one embodiment, the audio readout is an audible embodiment of a notification, and the visual notification is a displayable embodiment of the same notification. For example, the notification may be an incoming message, wherein the visual notification is the visual component of the message (e.g., text and optionally images) and the audio readout is a text-to-speech conversion of the message (e.g., a computer-generated voice reading the notification).

Where the notification is received from a specific application running on the electronic device 105, the visual cue module 215 may open window for that application, the window displaying the notification received from the specific application. The visual cue module 215 may then display a visual cue within the window, the visual cue marking the notification received from the specific application. In one example, the visual cue indicates a current position of the audio readout, wherein the audio readout corresponds to the notification received from the specific application.

In certain embodiments, the visual cue indicates a location in the visual notification corresponding to a current position of the audio readout. For example, the notification may comprise a plurality of words, characters, lines, sentences, paragraphs, or the like, wherein the visual cue indicates a word, character, line, sentence, paragraph, etc. currently read in the audio readout. In some embodiments, the visual cue advances as the audio readout continues to be presented (e.g., read out).

The visual cue may be any cue configured to drawn the user's attention to the location in the visual notification corresponding to a current position of the audio readout. In one non-limiting example, the visual cue may be a highlighted word, character, line, sentence, paragraph, etc. corresponding to a currently presented portion of the audio readout. As another non-limiting example, an already-read portion of the visual notification may be faded or grayed out, while an unread portion of the visual notification may be a normal font color (e.g., non-faded). The above examples are for illustration and are not to limit the scope of the visual cue.

In some embodiments, the visual cue module 215 presents the visual notification in response to the user attention state being a state of user interest. For example, the notification maybe an incoming message received while the electronic device 105 is in an audio readout mode. Thus, the electronic device 105 may read out the message (e.g., present the audio readout corresponding to the message) without displaying the visual component of the message. Alternatively, the electronic device 105 may read out the message while displaying the visual component in the background of a user interface or in a reduced-size window within the user interface.

In response to the attention state module determining that the user attention state is a state of user interest (e.g., due to the user picking up the electronic device 105, looking at the electronic device 105, or the like), the visual cue module 215 may display the visual component of the message, display the visual component in a foreground window, and/or enlarge a window displaying the visual component (e.g., the visual notification). Further, the visual cue module 215 displays a visual cue in the visual component of the message, the visual cue indicating a location corresponding to a current location of the audio readout. The visual cue module 215 may comprise hardware circuits, program code operating on a processing device, or combinations of hardware circuits and program code.

In some embodiments, the visual cue module 215 may present the visual notification on an external device communicatively coupled to the electronic device 105. For example, the electronic device 105 may be a smartphone, a tablet computer, a laptop computer, or the like, that is connected (e.g., via wired connection or wireless connection) to the external device. The external device may be any device external to the electronic device 105 that includes an electronic display. Examples of external devices include, but are not limited to, a smartwatch, a wearable display, a television, and the like. In further embodiments, the visual cue module 215 may present the visual cue on the visual notification displayed on the external device.

In one embodiment, the visual cue module 215 may present the visual cue on the visual notification displayed on the external device in response to the user paying attention to the external device (e.g., the user looking at a smartwatch wireless connected to the external device 105). In another embodiment, the visual cue module 215 may present the visual notification and/or the visual cue on the external device as a default action when the user attention state is in a neutral state.

The modules 205-215 allow the notification module 120 to present an audio readout to the user, to determine a user attention state, and to present a visual cue in a visual notification corresponding to the audio readout, in response to the user attention state being a state of interest. For example, the attention state module 210 may determine that the user attention state is a state of interest in response to certain predetermined cues, such as the user holding the electronic device 105 and/or looking at the electronic device 105. In response to the user interest, the visual cue module 215 presents the visual cue on the visual notification. In some embodiments, the audio readout module 205 may terminate the audio readout in response to the visual cue module 215 presenting the visual cue. In other embodiments, the audio readout module 205 may continue to present the audio readout while the visual cue module 215 presents the visual cue. For example, the visual cue module 215 may adjust the position of the visual cue such that the visual cue tracks a current position of the audio readout as the audio readout progresses.

Figure 3:
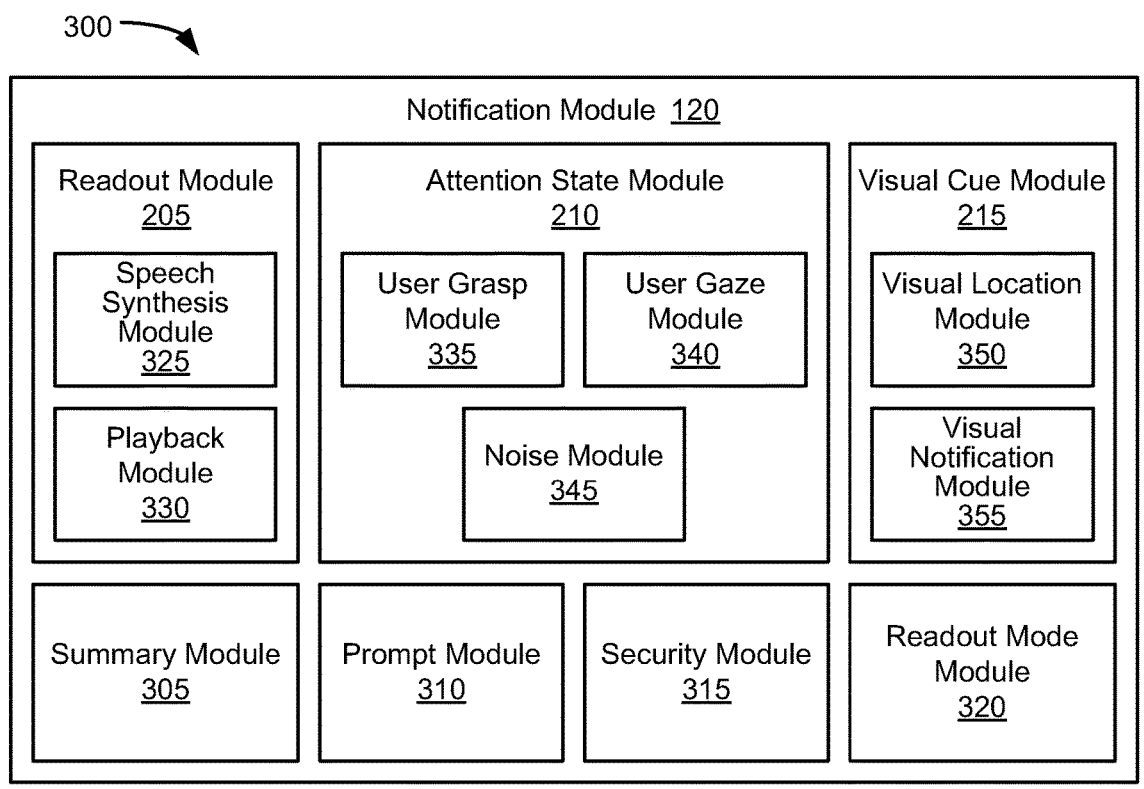
FIG. 3 is a schematic block diagram illustrating another embodiment of an apparatus for managing audio readouts and visual notifications.

FIG. 3 depicts a notification apparatus 300 comprising a notification module 120, according to embodiments of the disclosure. The notification module 120 may be substantially as described above with reference to FIGS. 1 and 2. As depicted, the notification module 120 may include a readout module 205, and attention state module 210, and a visual cue module 215. The notification module 120 may further comprise a summary module 305, a prompt module 310, a security module 315, a readout mode module 320, a speech synthesis module 325, a playback module 330, a user grasp module 335, a user gaze module 340, a noise module 345, a visual location module 350, and a visual notification module 355. The modules 205-215 and 305-355 may be communicatively coupled to one another. The notification module 120 may comprise hardware circuits, program code operating on a processing device, or combinations of hardware circuits and program code.

The summary module 305, in one embodiment, is configured to generate a summary readout of a received notification. In some embodiments, a received notification may be longer than a threshold length. The summary module 305 may be further configured to determine the length the received notification. In response to the notification exceeding the threshold length, the summary module 305 may generate a summary readout of the receive notification.

In one embodiment, the summary module 305 controls the prompt module 310 to prompt the user whether to present a summary readout of the received notification in response to the received notification exceeding a threshold length. The user responds affirmatively to the prompt (e.g., indicating a desire for the summary readout), the summary module 305 may generate a summary readout of the receive notification, wherein the readout module 205 presents the summary readout to the user.

In another embodiment, the summary module 305 may automatically generate the summary readout in response the received notification exceeding the threshold length. The summary module 305 may further automatically signal the readout module 205 to present the summary readout. After the readout module 205 finishes presenting the summary readout, the prompt module 310 may then prompt the user whether to present the entire notification (e.g., a full version of the receive notification).

In some embodiments, the summary module 305 is further configured to generate a summary of a portion of the audio readout previously presented to the user. For example, if the readout module 205 has to pause the audio readout (e.g., in response to ambient noise levels exceeding a threshold, in response to an incoming notification of higher priority, or in response to user command), then the summary module 305 may generate a summary of the portion of the audio readout already presented. The summary of the portion of the audio readout already presented module is designed to give the user context, thereby refreshing the user's memory of the portion of the audio readout already presented. The summary module 305 may comprise hardware circuits, program code operating on a processing device, or combinations of hardware circuits and program code.

The prompt module 310, in one embodiment, is configured to prompt the user whether to present an audio readout of a notification. The prompt module 310 may further listen for a response from the user. In one embodiment, the user may respond affirmatively or negatively. In another embodiment, the user may respond to the user command, for example command to present the audio readout. Based on the user response, the prompt module 310 may control the readout module 205 to present the audio readout.

In some embodiments, the prompt module 310 may prompt the user whether to present a summary of a received notification. For example, if the received notification is lengthy (e.g., larger than a threshold amount), then the prompt module 310 may query the user whether to present a summarized version of the received notification or the full version of the received notification. In response to the user indicating desire for the summarized version, the prompt module 310 may control the summary module 305 to generate a summary of the received notification, and may then control the readout module 205 to present an audio readout corresponding to the summarized version of the received notification. Otherwise, in response to the user indicating desire for the full version, the prompt module 310 may control the readout module 205 to present an audio readout corresponding to the full version of the received notification.

In another embodiment, the prompt module 310 may prompt the user whether to present a full version of a received notification in response to the readout module 205 presenting a summary readout of the notification. For example, where the received notification exceeds a threshold length, the summary module 305 may automatically generate a summary readout (corresponding to a summarized version of the received notification) and the readout module 205 may present the summary readout. After the readout module 205 has presented the summary readout, the prompt module 310 may prompt the user whether to present the full version of the received notification. In response to an affirmative response to the prompt (e.g., a response indicating the user's desire for the full version), the prompt module 310 may control the readout module 205 to present an audio readout corresponding to the full version of the received notification.

In certain embodiments, the prompt module 310 may prompt the user whether to present a summary of an already read portion of the audio readout in response to the readout module 205 resuming the audio readout. For example, the readout module 205 may pause audio readout and then resume audio readout at a later time, wherein the prompt module 310 may prompt the user whether to present a summary of the already read portion of the audio readout. If the user responds affirmatively, then the prompt module 310 may control the summary module 305 to generate a summary of the already read portion of the audio readout, and then control the readout module 205 to present the summary prior to resuming the audio readout at the point where the audio readout was paused.

In one embodiment, the prompt module 310 may prompt the user whether to enter in audio readout mode. In response to a positive response from the user, the prompt module 310 may control the readout mode module 320 to begin a readout mode. The prompt module 310 may comprise hardware circuits, program code operating on a processing device, or combinations of hardware circuits and program code.

The security module 315, in one embodiment, controls access to the electronic device 105. In one embodiment, the security module 315 is configured to restrict access to the electronic device 105 in response to an unauthorized user holding the electronic device 105 and/or looking at the display device 130. The security module 315 may receive image data, for example from a front facing camera, and analyze the image data to identify the user holding the electronic device 105. In one embodiment, the security module 315 may utilize a facial recognition routine to determine whether the user holding the electronic device 105 is an authorized user of the electronic device 105.

In response to the user holding the electronic device 105 being an authorized user, the security module 315 may permit access to the electronic device 105. For example, the security module 315 may permit the readout module 205 to continue presenting the audio readout. In a further example, the security module 315 may also permit the display device 135 to display a visual notification corresponding to the audio readout and/or permit the visual cue module 215 to present the visual cue within the visual notification.

However, the security module 315 may restrict access to the electronic device in response to the user holding the electronic device 105 not being an authorized user. For example, the security module 315 may cause the readout module 205 to pause and/or terminate the audio readout if the user holding the electronic device 105 is not an authorized user. In a further example, the security module 315 may also lock the screen of the electronic device 105, thereby preventing the unauthorized user from viewing the visual notification. In some embodiments, the security module 315 may prevent both displaying the visual notification and presenting the visual cue within the visual notification, in response to the user holding the electronic device 105 not being an authorized user.

In some embodiments, the security module 315 restricts access by the unauthorized user to the electronic device 105 in response to the unauthorized user picking up the electronic device 105. In other embodiments, the security module 315 restricts access by the unauthorized user to the electronic device 105 in response to the unauthorized user both picking up the electronic device 105 and looking at the display device 130. The security module 315 may comprise hardware circuits, program code operating on a processing device, or combinations of hardware circuits and program code.

The readout mode module 320, in one embodiment, controls a readout mode of the electronic device 105. In one embodiment, the readout mode module 320 places the electronic device 105 in a readout mode in response to a user command. In another embodiment, the readout mode module 320 may place the electronic device 105 in a readout mode in response to the electronic device 105 being in a particular location (e.g., at home, at work, in a vehicle, etc.) and/or in response to the time of day. The readout mode module 320 comprise hardware circuits, program code operating on a processing device, or a combination of hardware circuitry and program code.

As used herein, a "readout mode" refers to a hands-free mode of the electronic device 105 where the electronic device presents information to the user in an audible format (e.g., an audio readout) and where the user interacts with the electronic device 105 via voice command. Thus, the display device 130 is not needed for machine-human interaction while the electronic device 105 is in the readout mode. However, in some embodiments the electronic device 105 may use the display device 130 to passively present supplemental information (e.g., time of day, battery indicator, signal strength meter, etc.) to the user while in the readout mode.

In one embodiment, the readout mode module 320 may set the electronic device 105 into the readout mode, wherein the readout module 205 automatically presents any new notifications to the user via audio readout while the electronic device 105 is in the readout mode. For example, the readout module 205 may generate and present an audio readout corresponding to a newly received message, such as an email message, a text message, a SMS message, etc. As another example, the user may query the electronic device 105, and the electronic device 105 may return a notification in response to the user query, wherein the readout module 205 may automatically generate and present an audio readout corresponding to the response to the user query.

In certain embodiments, the readout mode module 320 may cause the electronic device 105 to exit the readout mode in response to the user holding and looking at the display device 130. For example, the user may become interested in a notification presented via audio readout while the electronic device 105 is in the readout mode. Accordingly, the user may pick up and look at the electronic device 105. The attention state module 210 may interpret these actions and determine that the user attention state is a state of user interest, wherein the visual cue module 215 may present the visual cue. Further, the readout mode module 320 may cause the electronic device 105 to exit from the readout mode in response to the attention state module 210 determining that the user attention state is a state of user interest. In one embodiment, the readout mode module 320 may maintain the electronic device 105 in the readout mode while the user is holding the electronic device 105 but not looking at the electronic device 105.

In certain embodiments, the readout mode module 320 may cause the electronic device 105 to exit the readout mode in response to an ambient noise level being above a threshold for a predetermined time frame. For example, noise module 345 may monitor the ambient noise levels and determine that the ambient noise level has exceeded threshold level for predetermined time frame, indicating that the ambient noise is preventing the user from hearing and/or understanding of the audio readout. In response, the noise module 345 may signal the readout mode module 320 to exit the readout mode in the visual cue module 215 may present a visual cue on a visual notification corresponding to the audio readout, the visual cue being presented at a location corresponding to the last presented position of the audio readout.

The speech synthesis module 325, in one embodiment, generates an audio readout from a received notification. For example, the speech synthesis module 325 may use a text-to-speech routine to convert a text portion of a receive notification into the audio readout. In one embodiment, the speech synthesis module 325 may generate an audio readout of a summary of the received notification. For example, if the received notification exceeds a certain length, the summary module 305 may create a summary of the received notification, and the speech synthesis module 325 may generate an audio readout from the summary.

The speech synthesis module 325 may comprise hardware circuits, program code operating on a processing device, or a combination of hardware circuitry and program code. As depicted, the speech synthesis module 325 may be a component of the readout module 205. For example, the speech synthesis module 325 may be a hardware component of the readout module 205. As another example, the speech synthesis module 325 may be a subroutine of the readout module 205. However, in other embodiments the speech synthesis module 325 may be an independent component communicatively coupled to the readout module 205.

The playback module 330, in one embodiment, is configured to control playback of the audio readout. For example, the playback module 330 may begin to play the audio readout in response to user command. As another example, the playback module 330 may begin to play the audio readout automatically in response to receiving a notification, the audio readout corresponding to the received notification.

In some embodiments, the playback module 330 controls playback of the audio readout based on whether the electronic device 105 is in an audio readout mode. In one embodiment, the playback module 330 may automatically play the audio readout in response to the electronic device 105 being in an audio readout mode. In another embodiment, the playback module 330 may automatically stop the audio readout in response to the electronic device 105 exiting the audio readout mode.

In certain embodiments, the playback module 330 may pause the audio readout in response to the attention state module 210 determining the user attention state to be a state of user distraction. For example, the playback module 330 may pause the audio readout in response to an ambient noise level exceeding an inaudible state threshold, the ambient noise level indicating that the user is distracted and/or is unable to pay attention to the audio readout due to the ambient noise. In one embodiment, the playback module 330 may resume the audio readout in response to the attention state module 210 later determining that the user attention state is no longer in the state of user distraction. For example, the playback module 330 may resume the audio readout in response to the ambient noise level dropping below an audible state threshold.

In some embodiments, the playback module 330 determines a current position of the audio readout. For example, the playback module 330 may track the current position of the audio readout in order to resume the audio readout at the position where the readout was stopped. Further, the playback module 330 may identify a portion of the audio readout already presented, wherein summary module 305 may create a summary of the already present portion of the audio readout when the audio readout resumes.

The playback module 330 may comprise hardware circuits, program code operating on a processing device, or a combination of hardware circuitry and program code. As depicted, the playback module 330 may be a component of the readout module 205. For example, the playback module 330 may be a hardware component of the readout module 205. As another example, the playback module 330 may be a subroutine of the readout module 205. However, in other embodiments the playback module 330 may be an independent component communicatively coupled to the readout module 205.

The user grasp module 335, in one embodiment, determines whether user is holding the electronic device 105. For example, the user grasp module 335 may comprise hardware and/or software to determine whether the electronic device 105 is being grasped by a user. In certain embodiments, the user grasp module 335 receives sensor data indicative of whether the user is holding the electronic device 105. For example, electronic device 105 may include one or more sensors embedded in a body of the electronic device 105, said sensors configured to measure temperature and/or pressure at the surface of the electronic device 105. As another example, the electronic device 105 may measure acceleration data and/or proximity data. Based on the received sensor data, the user grasp module 335 may determine whether the user is holding the electronic device 105.

In one embodiment, the user grasp module 335 signals the attention state module 210 in response to the user holding the electronic device 105. The attention state module 210 may then determine that the user attention state is a state of user interest due to the user holding the electronic device 105. However, the user may be holding the electronic device 105 but not paying attention to the display of the electronic device 105. For example, the user may be moving the electronic device 105 from one location to another. Accordingly, the user may not desire that the audio readout be paused.

Thus, in another embodiment, the user grasp module 335 may indicate to the attention state module 210 that the user is holding the electronic device 105, wherein the attention state module 210 requests the user gaze module 340 to determine whether the user is looking at the electronic device. If the user is both holding the electronic device 105 and looking at the electronic device 105, then the attention state module 210 may determine that the user attention state is a state of user interest. Otherwise, the attention state module 210 may determine that the user attention state is not in the state of user interest, but rather in a neutral state.

In one embodiment, the user grasp module 335 may trigger the security module 315 in response to determining that a user is holding the electronic device 105. The security module 315 may then determine whether the user holding the electronic device 105 is an authorized user of the electronic device 105 and restricting access to the electronic device 105 in response to an unauthorized user holding the device. In one embodiment, the user grasp module 335, and/or the security module 315, may further trigger the user gaze module 340 to determine whether the user holding the electronic device 105 is looking at the device. In response to an unauthorized user looking at the device, the security module 315 may optionally restrict access to the electronic device 105, such as locking the screen, pausing/terminating the audio readout, preventing presentation of the visual notification and visual cue, and the like.

The user grasp module 335 may comprise hardware circuits, program code operating on a processing device, or a combination of hardware circuitry and program code. As depicted, the user grasp module 335 may be a component of the attention state module 210. For example, the user grasp module 335 may be a hardware component of the attention state module 210. As another example, the user grasp module 335 may be a subroutine of the attention state module 210. However, in other embodiments the user grasp module 335 may be an independent component communicatively coupled to the attention state module 210.

The user gaze module 340, in one embodiment, determines whether a user is looking at the electronic device 105. For example, the user gaze module 340 may comprise hardware and/or software that determines a location of the user's gaze (e.g., determines where the user is looking) relative to the electronic device 105. In certain embodiments, the user gaze module 345 receives image data from a front-facing camera, the image data including an image of the user's face and/or eyes. Based on the position of the user's face and/or eyes, the user gaze module 340 may determine whether the user is looking at the electronic device 105.

In some embodiments, the user gaze module 340 signals the attention state module 210 in response to the user looking at the electronic device 105. The attention state module 210 may then determine that the user attention state is a state of user interest due to the user looking at the electronic device 105. Thereafter, the attention state module 210 may signal the visual cue module 215, wherein the visual cue module 215 may present the visual cue due to the user looking at the electronic device 105 (e.g., as indicated by the user attention state).

In one embodiment, the user gaze module 340 continually monitors image data (e.g., received from the front facing camera) to determine whether the user is looking at the electronic device 105. However, in another embodiment the user gaze module 340 may acquire image data (e.g., request image data from the front facing camera) only in response to a trigger. In one embodiment, the trigger may be a proximity sensor determining that the user is within a predetermined proximity to the electronic device 105. In another embodiment, the trigger may be the user grasp module 335 determining that the user is holding the electronic device 105.

The user gaze module 340 may comprise hardware circuits, program code operating on a processing device, or a combination of hardware circuitry and program code. As depicted, the user gaze module 340 may be a component of the attention state module 210. For example, the user gaze module 340 may be a hardware component of the attention state module 210. As another example, the user gaze module 340 may be a subroutine of the attention state module 210. However, in other embodiments the noise module 345 may be an independent component communicatively coupled to the attention state module 210.

The noise module 345, in one embodiment, determines a user attention state based on an ambient noise level. In certain embodiments, the noise module 345 measures the ambient noise level and compares the measured noise level to one or more thresholds. Based on the comparison, the noise module 345 may determine whether the user attention state is a state of user distraction. Further, having identified the user attention state as a state of the user distraction, the noise module 345 may continue to monitor ambient noise levels and compare them to one or more noise thresholds in order to determine whether to the user attention state returns to a non-distracted state.

The noise module 345, in one embodiment, may be communicatively coupled to an ambient noise sensor, such as a microphone or noise meter. In one embodiment, the noise module 345 measures noise levels using the ambient noise sensor. In another embodiment, the noise module 345 receives noise levels measured by the ambient noise sensor. As discussed above, the input device 125 may comprise one or more of a microphone and a noise meter. The noise module 345 may analyze received sound data to identify an ambient noise level.

In some embodiments, the noise module 345 compares the ambient noise level to an inaudible state threshold. The inaudible state threshold may be an operator-defined and/or a user-defined threshold corresponding to a noise level at which conversation at normal volume levels is inaudible and/or unintelligible. In response to the ambient noise level exceeding the inaudible state threshold, the noise module 345 may determine the user attention state to be a state of user distraction. The attention state module 210 may then indicate the state of user distraction to the readout module 205, wherein the readout module 205 pauses the audio readout while the user attention state is a state of user distraction.

In certain embodiments, the noise module 345 may compare the ambient noise level to an audible state threshold. The noise module 345 may compare the ambient noise level to the audible state threshold in response to the audio readout being paused due to ambient noise levels (e.g., due to the ambient noise level exceeding the inaudible state threshold). Thus, the noise module 345 may use the audible state threshold to determine when the ambient noise level is sufficiently reduced to resume and/or restart the audio readout. In some embodiments, the audible state threshold is the same value as the inaudible state threshold, while in other embodiments the audible state threshold may be a noise threshold with a lower value than the inaudible state threshold. In one embodiment, the audible state threshold is a predetermined amount lower than the inaudible state threshold. In another embodiment, the audible state threshold may be a user-defined amount lower than the inaudible state threshold.

In one embodiment, the noise module 345 may determine the user attention state to no longer be a state of user distraction (e.g., to be in a neutral state) in response to the ambient noise level dropping below the audible state threshold. In a further embodiment, the noise module 345 may determine the user attention state to no longer be a state of user distraction in response to the ambient noise level dropping below the audible state threshold for a threshold amount of time. The threshold amount of time that the ambient noise level must be below the audible state threshold may be operator- and/or user-defined.

As an example, if the user is at a train station a train may pass near to the user thereby raising the ambient noise level. The ambient noise from the passing train may be loud enough impede and/or prevent the user from hearing the audio readout, as indicated by the ambient noise level exceeding the inaudible state threshold. Accordingly, the noise module 345 may determine that the user attention state is in a state of user distraction due to the noise of the passing train and the readout module 205 may pause the audio readout.

The noise module 345 may continue to monitor the ambient noise levels (e.g., measuring (sampling) the ambient noise level at regular intervals such as every second or fraction thereof). In one embodiment, the noise module 345 determine the user state to no longer be a state of distraction (thereby triggering resumption of the audio readout) as soon as the ambient noise level drops below the audible state threshold. However, where the train includes multiple cars, the noise level may fluctuate with the passing of each car. Thus, in another embodiment the noise module 345 may wait until the ambient noise level drops below the audible state threshold for the threshold amount of time before determining the user attention state to no longer be in a state of user distraction (due to the passing train).

In some embodiments, the noise module 345 may monitor the passage of time after the ambient noise level exceeds the inaudible state threshold. For example, the noise module 345 may track how long it takes for the ambient noise level to pass below the audible state threshold. In response to the ambient noise level remaining above the audible state threshold for a predetermined time frame, the noise module 345 may signal to the electronic device 105 to exit from an audio readout mode, wherein the readout module 205 stops the audio readout and the visual cue module 215 presents the visual cue and visual notification.

In some embodiments, the predetermined time frame associated with exiting the audio readout mode may be the same amount of time as the threshold amount of time associated with resuming the audio readout, discussed above. However, in other embodiments the predetermined time frame associated with exiting the audio readout mode may be a different amount of time as the threshold amount of time associated with resuming the audio readout. For example, the readout module 205 may resume the audio readout if the ambient noise level remains below an audible state threshold for 2 seconds, while the noise module 345 may signal the electronic device 105 to exit from the audio readout mode if the ambient noise level remains above the audible state threshold for 5 seconds. The amounts of time in this example are for illustration and are not to be limiting. Other embodiments may include shorter and/or longer amount of time.

The noise module 345 may comprise hardware circuits, program code operating on a processing device, or a combination of hardware circuitry and program code. As depicted, the noise module 345 may be a component of the attention state module 210. For example, the noise module 345 may be a hardware component of the attention state module 210. As another example, the noise module 345 may be a subroutine of the attention state module 210. However, in other embodiments the noise module 345 may be an independent component communicatively coupled to the attention state module 210.

The visual location module 350, in certain embodiments, associates the current position of the audio readout with a location in the visual notification. For example, the visual location module 350 may track the current position of the audio readout and identify the corresponding location within the visual notification. As another example, identify the current position of the audio readout in response to a trigger (e.g., in response to the attention state module 210 determining the user attention state to be a state of interest) and identify a corresponding location within the visual notification.

Having identified a location in the visual notification corresponding to the current position of audio readout, the visual location module 350 may communicate the identified location within the visual notification to the visual cue module 215, wherein the visual cue module 215 presents a visual cue at the identified location. The visual location module 350 may comprise hardware circuits, program code operating on a processing device, or a combination of hardware circuitry and program code. As depicted, the visual location module 350 may be a component of the visual cue module 215. For example, the visual location module 350 may be a hardware component of the visual cue module 215. As another example, the visual location module 350 may be a subroutine of the visual cue module 215. However, in other embodiments the visual location module 350 may be an independent component communicatively coupled to the visual cue module 215.

The visual notification module 355, in certain embodiments, presents the visual notification on the display device 135 in response to the attention state module 210 determining the user attention state to be a state of interest. As discussed above, the visual notification corresponds to the audio readout. In one embodiment, both the visual notification and the audio readout are based on the same notification, such as an incoming message, a response to a query, or the like. In some embodiments, presenting the visual notification comprises generating a window and displaying the visual notification therein, the bringing a window containing the visual notification to a foreground of a user interface, and/or enlarging a window containing the visual notification.

In one embodiment, the user attention state as determined to be a state of interest in response to the user holding the electronic device 105, wherein the visual notification module 355 presents the visual notification on the display device 135 in response to the user holding the electronic device 105. In another embodiment, the user attention state is determined to be a state of interest in response to the user looking at the electronic device 105, wherein the visual notification module 355 presents the visual notification on the display device 135 in response to the user looking at the electronic device 105. In a further embodiment, the visual notification module 355 presents the visual and a location on the display device 135 in response to both the user holding the device and looking at the device.

In some embodiments, the visual notification module 355 also presents the visual notification on the display device 135 in response to an ambient noise level being above an inaudible state threshold for more than a predetermined time frame. For example, if the ambient noise level exceeds the inaudible state threshold and does not drop below an audible state threshold for a predetermined time frame, then the electronic device 105 may exit from a readout mode and the visual notification module 355 may present the visual notification on the display device 135. Further, the visual cue module 215 may present a visual cue in the visual notification in response to the ambient noise level being above the inaudible state threshold for more than the predetermined time frame, the visual cue indicating a location in the visual notification corresponding to a current position of the audio readout at the time the audio readout was paused.

In some embodiments, the visual notification module 355 may present the visual notification on an external device communicatively coupled to the electronic device 105. For example, the electronic device 105 may be a smartphone, a tablet computer, a laptop computer, or the like, that is connected (e.g., via wired connection or wireless connection) to the external device. The external device may be any device external to the electronic device 105 that includes an electronic display. Examples of external devices include, but are not limited to, a smartwatch, a wearable display, a television, and the like.

In one embodiment, the visual notification module 355 may present the visual notification on the external device in response to the user paying attention to the external device (e.g., the user looking at a smartwatch wireless connected to the external device 105). In another embodiment, the visual notification module 355 may present the visual notification on the external device as a default action when the user attention state is in a neutral state.

The visual notification module 355 may comprise hardware circuits, program code operating on a processing device, or combinations of hardware circuits and program code. As depicted, the visual notification module 355 may be a component of the visual cue module 215. For example, the visual notification module 355 may be a hardware component of the visual cue module 215. As another example, the visual notification module 355 may be a subroutine of the visual cue module 215. However, in other embodiments the visual notification module 355 may be an independent component communicatively coupled to the visual cue module 215.

Figure 4:
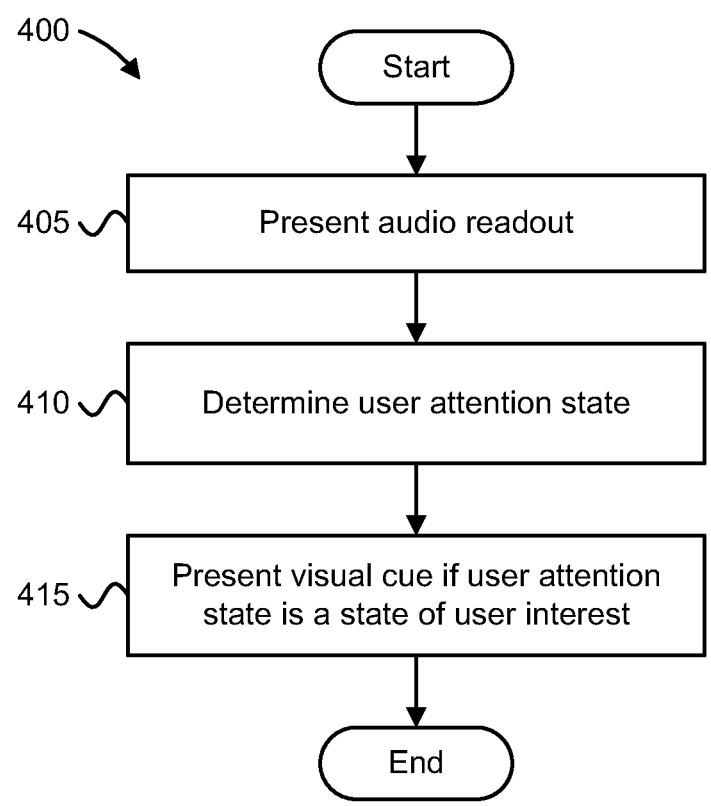
FIG. 4 is a schematic flow chart diagram illustrating one embodiment of a method for managing audio readouts and visual notifications.

FIG. 4 is a schematic flow chart diagram illustrating a method 400 for managing audio readouts and visual notifications, according to embodiments of the disclosure. In one embodiment, the method 400 is performed by the electronic device 105. In another embodiment, the method 400 may be performed by the notification apparatuses 200 and/or 300. Alternatively, the method 400 may be performed by a processor 110 and a computer readable storage medium, such as the memory 115. The computer readable storage medium may store code that is executed on the processor 110 to perform the functions of the method 400.

The method 400 begins and presents 405 an audio readout to a user using electronic device. The electronic device may be the electronic device 105 described above with reference to FIGS. 1-4. In one embodiment, the readout module 205 presents 405 the audio readout to the user. In certain embodiments, presenting 405 the audio readout to the user includes controlling the audio output device 125 to play the audio readout.

The method 400 determines 410 a user attention state. In one embodiment, the attention state module 210 determines 410 the user attention state. For example, the attention state module 210 may use sensor input to determine the user attention state. In certain embodiments, determining 410 the user attention state includes processing sensor data from a plurality of sensors to determine the user attention state, including pressure data, temperature data, proximity data, image data, and/or noise level data. In some embodiments, the user attention state may be a state of user interest, a state of user distraction, or a neutral state of neither interest nor distraction.

The method 400 then presents 415 the visual cue in response to the user attention state being a state of user interest. The method 400 ends. In one embodiment, the visual cue module 215 presents 415 the visual cue in response to the user attention state being a state of user interest. The visual cue is presented within a visual notification that corresponds to the audio readout. In some embodiments, the visual cue indicates a location in the visual notification corresponding to a current position of the audio readout. In other embodiments, the visual cue indicates a location in the visual notification corresponding to a last presented position of the audio readout.

In some embodiments, presenting 415 the visual cue includes verifying that the user holding (or looking at) the electronic device is an authorized user of the electronic device. For example, the security module 315 may verify that the user is an authorized user and permit the visual cue module 215 to present 415 the visual cue in response to the user being an authorized user. Verifying that the user is an authorized user may include capturing image data of the user and performing facial recognition to determine if the user is an authorized user.

Figure 5:
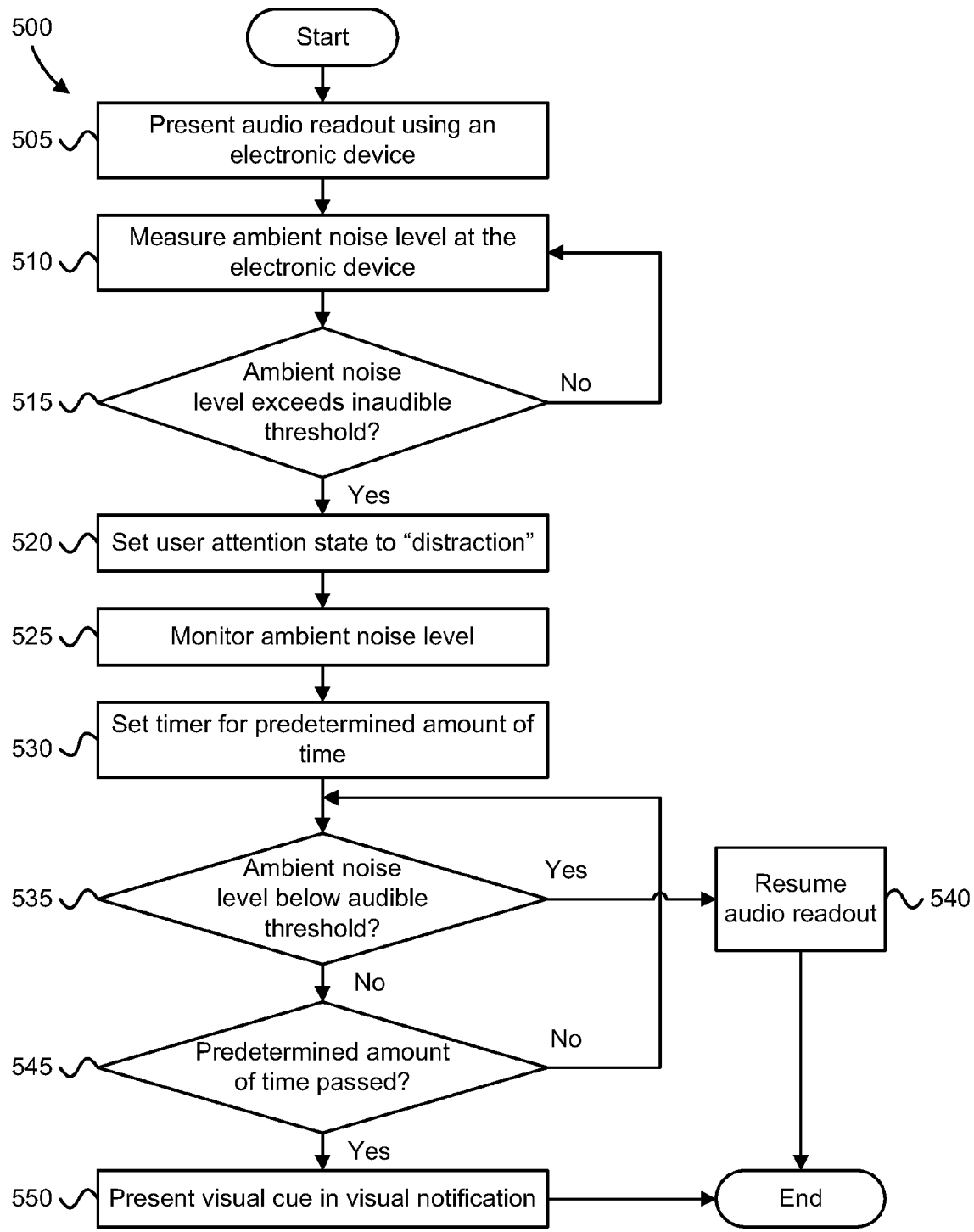
FIG. 5 is a schematic flow chart diagram illustrating one embodiment of a method for managing audio readouts and visual notifications based on ambient noise levels.

FIG. 5 is a schematic flow chart diagram illustrating a method 500 for managing audio readouts and visual notifications, according to embodiments of the disclosure. In one embodiment, the method 500 is performed by the electronic device 105. In another embodiment, the method 500 may be performed by the notification apparatuses 200 and/or 300. Alternatively, the method 500 may be performed by a processor 110 and a computer readable storage medium, such as the memory 115. The computer readable storage medium may store code that is executed on the processor 110 to perform the functions of the method 500.

The method 500 begins and presents 505 an audio readout to a user using an electronic device. The electronic device may be the electronic device 105 described above with reference to FIGS. 1-4. In one embodiment, the readout module 205 presents 505 the audio readout to the user. In certain embodiments, presenting 505 the audio readout to the user includes controlling the audio output device 125 to play the audio readout.

The method 500 measures 510 an ambient noise level at the electronic device. In one embodiment, the noise module 345 measures 510 the ambient noise level. In some embodiments, measuring 510 the ambient noise level includes receiving data from a microphone, noise meter, or other device for measuring ambient noise. The method 500 then determines 515 whether the ambient noise level exceeds an inaudible state threshold. In one embodiment, the noise module 345 determines 515 whether the ambient noise level exceeds the inaudible state threshold.

In response to the ambient noise level exceeding the inaudible threshold, the method 500 then sets 520 the user attention state to a state of user distraction. In one embodiment, the attention state module 210 sets 520 the user attention state to a state of user distraction. Otherwise, in response to the ambient noise level not exceeding the inaudible threshold, the method 500 returns to measuring 510 the ambient noise level at the electronic device.

The method 500 monitors 525 the ambient noise level in response to setting 520 the user attention state to a state of user distraction (due to the ambient noise level exceeding the inaudible threshold). In one embodiment, the noise module 345 monitors 525 the ambient noise level in response to the attention state module 210 setting 520 the user attention state to state of user distraction. In some embodiments, monitoring 525 the ambient noise level includes sampling an ambient noise level at the electronic device at regular intervals, for example once every second or fraction thereof.

Additionally, the method 500 sets 530 a timer in response to setting 520 the user attention state to a state of user distraction. In one embodiment, the noise module 345 sets 530 the timer. In certain embodiments, setting 530 the timer includes setting the timer for a predetermined amount of time (e.g., equal to a predetermined time frame, as discussed above with reference to FIG. 3).

The method 500 determines 535 whether the ambient noise level drops below an audible threshold for a threshold amount of time. In one embodiment, the noise module 345 determine 535 whether the ambient noise level drops below the audible threshold for the threshold amount of time. In certain embodiments, the audible threshold is lower than the inaudible threshold. In further embodiments, the audible threshold may be a user-specified amount lower than the inaudible threshold. In one embodiment, determining 535 whether the ambient noise level drops below the audible threshold for the threshold amount of time includes setting a second timer and determining whether the ambient noise level remains below the audible state threshold until the second timer expires. In a further embodiment, the second timer may be set for a shorter amount of time than the first timer set in response to the user attention state being a state of user distraction.

In response to the ambient noise level dropping below the audible threshold for a threshold amount of time, the method 500 then resumes 540 the audio readout. In one embodiment, the readout module 205 resumes 540 the audio readout in response the ambient noise level dropping below the audible threshold and the method 500 ends. Otherwise, in response to the ambient noise level not dropping below the audible threshold, the method 500 determines 545 whether the predetermined amount of time has passed (e.g., whether the timer has expired). In one embodiment, the noise module 345 determines 545 whether the predetermined amount of time has passed.

In response to the predetermined amount of time being passed (e.g., in response to the ambient noise level remaining above the audible state threshold for the predetermined time frame), the method 500 presents 550 a visual cue in a visual notification that corresponds to the audio readout and the method 500 ends. In one embodiment, the visual cue module 215 presents 550 the visual cue in the visual notification it response to the ambient noise level remaining above the audible state threshold for the predetermined amount of time. Otherwise, the method 500 returns to determining 535 whether the ambient noise level drops below the audible threshold for the threshold amount of time.

Figure 6:
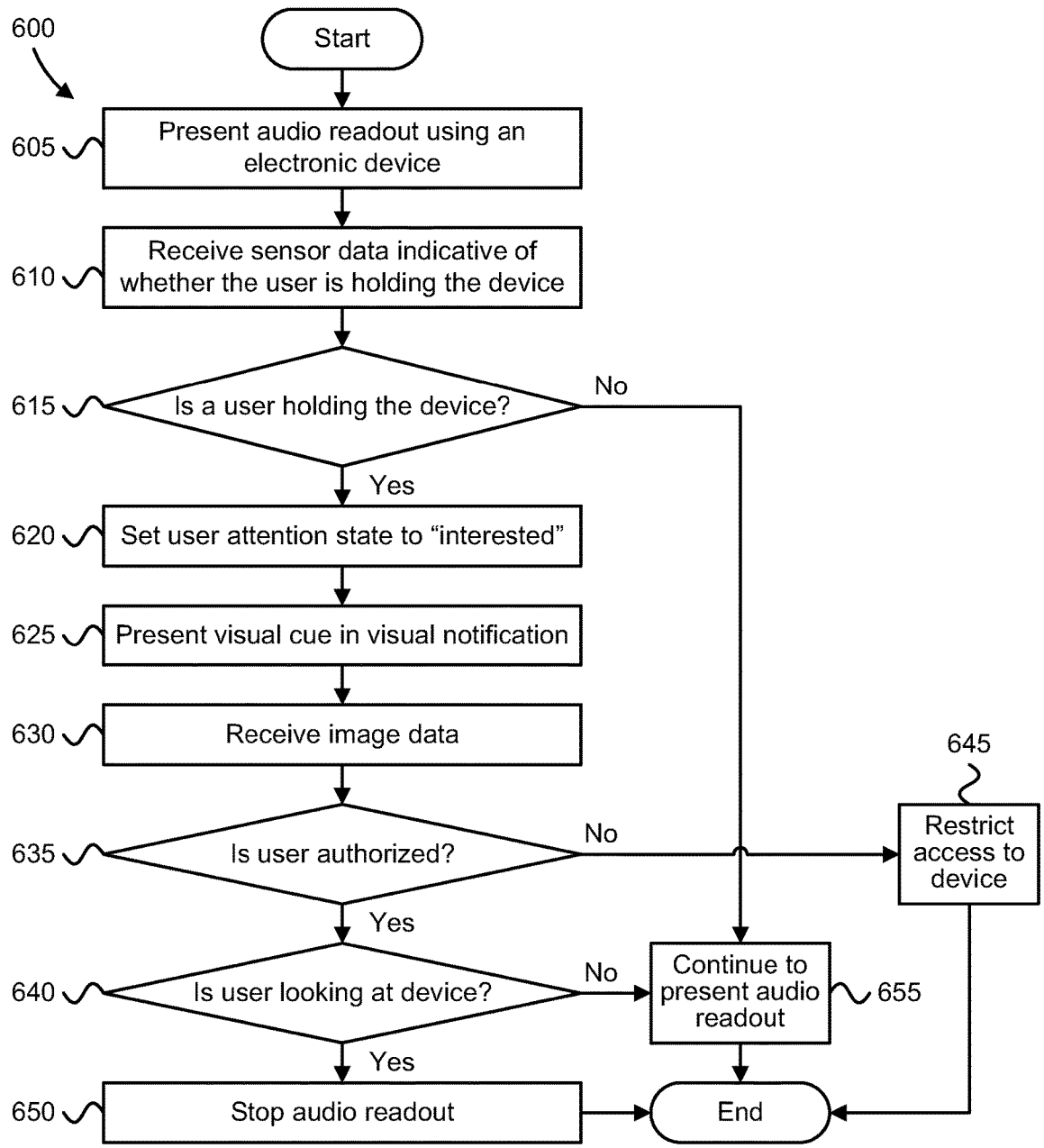
FIG. 6 is a schematic flow chart diagram illustrating one embodiment of a method for managing audio readouts and visual notifications based on sensor data.

FIG. 6 is a schematic flow chart diagram illustrating a method 600 for managing audio readouts and visual notifications, according to embodiments of the disclosure. In one embodiment, the method 600 is performed by the electronic device 105. In another embodiment, the method 600 may be performed by the notification apparatuses 200 and/or 300. Alternatively, the method 600 may be performed by a processor 110 and a computer readable storage medium, such as the memory 115. The computer readable storage medium may store code that is executed on the processor 110 to perform the functions of the method 600.

The method 600 begins and presents 605 an audio readout to a user using electronic device. The electronic device may be the electronic device 105 described above with reference to FIGS. 1-4. In one embodiment, the readout module 205 presents 605 the audio readout to the user. In certain embodiments, presenting 605 the audio readout to the user includes controlling the audio output device 125 to play the audio readout.

The method 600 receives 610 sensor data indicative of whether the user is holding the electronic device. In some embodiments, the sensor data may include pressure data, temperature data, acceleration data, proximity data, or the like. In one embodiment, the user grasp module 335 receives 610 the sensor data.

The method 600 determines 615 whether the user is holding the electronic device based on the received sensor data. In one embodiment, the user grasp module 335 determine 615 whether the user is holding the electronic device based on the received sensor data. In one embodiment, determining 615 whether the user is holding the electronic device based on the received sensor data includes comparing the received sensor data to one or more thresholds.

In response to the user holding the device, the method 600 sets 620 the user attention state to a state of user interest. In one embodiment, the attention module 210 sets 620 the user attention state to a state of user interest in response to the user holding the device. Otherwise, in response to the user not holding the electronic device, the method 600 continues 655 to present the audio readout.

The method 600 presents 625 a visual cue in the visual notification corresponding to the audio readout, in response to the user attention state being a state of user interest. In one embodiment, the visual cue module 210 presents 625 the visual cue in the visual notification. In some embodiments, presenting 625 the visual cue includes presenting the visual notification on the display device 135 and visually indicating a location within the visual notification corresponding to a current position of the audio readout.

The method 600 receives 630 image data. In one embodiment, a user gaze module 340 receives 630 the image data, for example from a front facing camera. The method 600 determines 635 whether the user holding the electronic device is an authorized user. In one embodiment, the security module 315 determines 635 whether an authorized user is holding the electronic device. In certain embodiments, determining 635 whether the user holding the electronic device is an authorized user includes analyzing the image data to determine whether an authorized user is holding the electronic device.

In response to determining 635 that the user holding the device is an authorized user of the electronic device, the method 600 determines 640 whether the user is looking at the electronic device. Otherwise, in response to determining 635 that the user holding the electronic device is not an authorized user of the electronic device, the method 600 restricts 655 access to the electronic device and the method 600 ends. In one embodiment, the security module 315 restricts 655 access to the electronic device. In some embodiments, restricting 655 access to the electronic device includes locking out the electronic device.

The method 600 then. In one embodiment, determines 640 whether the user is looking at the electronic device includes the user gaze module 340 determining 640 whether the user is looking at the electronic device (e.g., at a display screen of the electronic device). In some embodiments, determining 640 whether the user is looking at the electronic device includes determining a face position and/or an eye position with respect to the electronic device.

In response to determining 640 that the user is looking at the electronic device, the method 600 stops 650 the audio readout and the method 600 ends. In one embodiment, the readout module 205 stops 650 the audio readout in response to the user looking at the electronic device. Otherwise, in response to determining 640 that the user is not looking at the electronic device, the method 600 continues 655 to present the audio readout and the method 600 ends.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
   presenting an audio readout to a user using an electronic device, the audio readout being spoken text belonging to a received notification;
   determining a user attention state; and
   presenting a visual cue in a visual notification in response to the user attention state being a state of user interest, the visual notification displaying text of the received notification, wherein the visual cue indicates a portion of the text in the visual notification corresponding to a portion of the spoken text currently presented by the audio readout.

2. The method of claim 1, wherein the visual cue advances within the visual notification as the audio readout continues.

3. The method of claim 1, wherein determining the user attention state comprises:
   receiving image data of the user;
   determining whether the user is looking at the electronic device based on the image data; and
   determining the user attention state to be a state of user interest in response to the user looking at the electronic device.

4. The method of claim 1, wherein presenting the visual cue in the visual notification comprises:
   displaying the visual notification on an external device communicatively coupled to the electronic device; and
   presenting the visual cue on the visual notification displayed on the external device.

5. The method of claim 1, wherein determining the user attention state comprises:
   receiving sensor data;
   determining whether a user is holding the electronic device based on the sensor data; and
   determining the user attention state to be a state of user interest in response to a user holding the electronic device.

6. The method of claim 5, further comprising:
   receiving image data in response to determining that a user is holding the electronic device;
   determining whether a user holding the electronic device is an authorized user of the electronic device based on the image data; and
   pausing the audio readout in response to the user holding the electronic device not being an authorized user of the electronic device; and
   restricting access to the electronic device.

7. The method of claim 5, further comprising:
   receiving image data in response to determining that a user is holding the electronic device;
   determining whether the user is looking at the electronic device based on the image data; and
   presenting a visual notification corresponding to the audio readout in response to the user looking at the electronic device, wherein presenting a visual cue in a visual notification comprises presenting the visual cue in the visual notification in response to the user looking at the electronic device.

8. The method of claim 1, further comprising:
   pausing the audio readout in response to the user attention state being a state of user distraction;
   re-determining the user attention state in response to pausing the audio readout; and
   resuming the audio readout in response to the user attention state no longer being a state of user distraction.

9. The method of claim 8, wherein resuming the audio readout comprises:
   obtaining a summary of a portion of the audio readout previously presented to the user;
   prompting the user whether to present the summary; and
   presenting the summary in response to an affirmative response to the prompt.

10. The method of claim 8, wherein determining the user attention state comprises:
    measuring an ambient noise level at the electronic device;
    comparing the ambient noise level to an inaudible state threshold; and
    determining the user attention state to be a state of user distraction in response to the ambient noise level being above the inaudible state threshold.

11. The method of claim 10, wherein re-determining the user attention state comprises:
    measuring an ambient noise level at the electronic device;
    comparing the ambient noise level to an audible state threshold; and
    determining the user attention state to no longer be a state of user distraction in response to the ambient noise level returning below the audible state threshold for a threshold amount of time.

12. The method of claim 10, further comprising:
    determining whether the ambient noise level remains above an audible state threshold for a predetermined time frame; and
    presenting the visual notification and the visual cue, in response to the ambient noise level remaining above the audible state threshold for the predetermined time frame, wherein the visual cue indicates a location in the visual notification corresponding to a current position of the audio readout.

13. The method of claim 1, further comprising:
    receiving the notification; and
    receiving a user command to read the notification, wherein presenting the audio readout comprises presenting an audio readout to the user in response to the user command.

14. The method of claim 13, further comprising:
    determining a length of the notification; and
    prompting the user whether to present a summary readout of the notification in response to the length exceeding a predetermined length, wherein presenting the audio readout comprises presenting the summary readout in response to an affirmative response to the prompt.

15. The method of claim 13, further comprising:
    determining a length of the notification, wherein presenting the audio readout comprises presenting a summary readout of the notification in response to the length exceeding a predetermined length; and
    prompting the user whether to present the entire notification, wherein presenting the audio readout further comprises presenting a full readout corresponding the entire notification in response to an affirmative response to the prompt.

16. An apparatus comprising:
    an audio output device;
    a display device;
    a processor; and
    a memory that stores code executable by the processor to:

present, via the audio output device, an audio readout to a user of the apparatus, the audio readout being spoken text belonging to a received notification;
determine a user attention state; and
present, via the display device, a visual cue in a visual notification in response to the user attention state being a state of user interest, the visual notification displaying text of the received notification, wherein the visual cue indicates a portion of the text in the visual notification corresponding to a portion of the spoken text currently presented by audio readout.

17. The apparatus of claim 16, further comprising an image sensor configured to capture image data, wherein determining the user attention state comprises:
receiving image data of the user;
determining whether the user is looking at the display device based on the image data; and
determining the user attention state to be a state of user interest in response to the user looking at the display device, wherein the visual cue indicates a location in the visual notification corresponding to a current position of the audio readout.

18. The apparatus of claim 17, wherein the memory further comprises code executable by the processor to terminate the audio readout in response to presenting the visual cue.

19. The apparatus of claim 16, wherein determining the user attention state comprises:
receiving sensor data;
determining whether a user is holding the apparatus based on the sensor data; and
determining the user attention state to be a state of user interest in response to a user holding the apparatus.

20. The apparatus of claim 19, further comprising an ambient noise sensor, wherein the memory further comprises code executable by the processor to:
measure an ambient noise level at the apparatus;
compare the ambient noise level to an inaudible state threshold;
pause the audio readout in response to the ambient noise level being above the inaudible state threshold;
re-measure an ambient noise level at the apparatus in response to pausing the audio readout;
compare the re-measured ambient noise level to an audible state threshold;
resume the audio readout in response to the re-measured ambient noise level being below the audible state threshold for a threshold amount of time; and
present the visual notification and the visual cue, in response to the ambient noise level remaining above an audible state threshold for a predetermined time frame.

* * * * *